Jan. 30, 1945.    J. DEUTSCH    2,368,526
CASH REGISTER WITH ATTACHED AUTOMATIC STAMP ISSUING APPARATUS
Filed March 18, 1941    6 Sheets-Sheet 1

Jakob Deutsch
Inventor

By *Carl Benst*
His Attorney

Jan. 30, 1945. J. DEUTSCH 2,368,526
CASH REGISTER WITH ATTACHED AUTOMATIC STAMP ISSUING APPARATUS
Filed March 18, 1941 6 Sheets-Sheet 2

Jakob Deutsch
Inventor

By *Karl Benst*
His Attorney

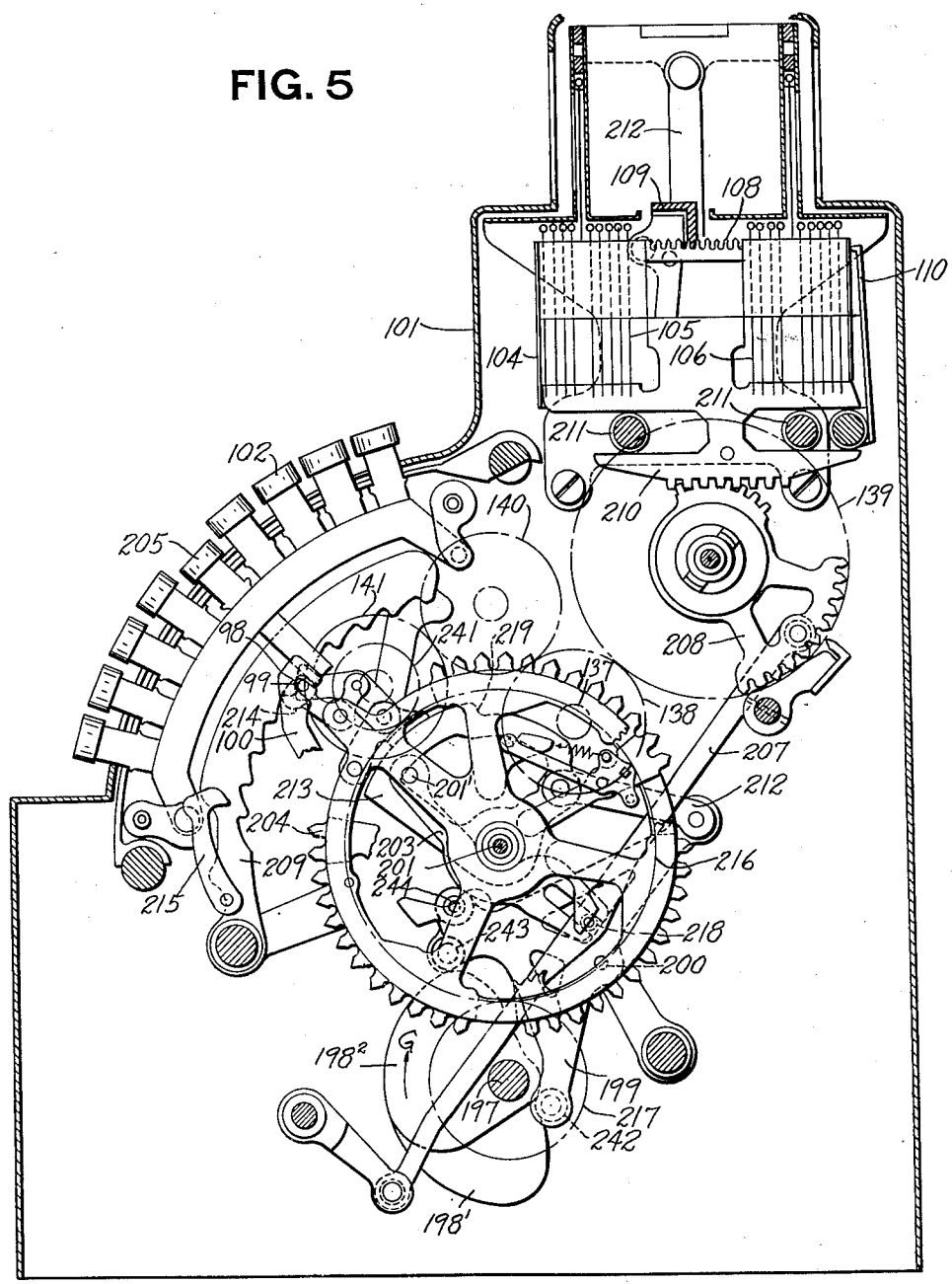

Jan. 30, 1945.   J. DEUTSCH   2,368,526
CASH REGISTER WITH ATTACHED AUTOMATIC STAMP ISSUING APPARATUS
Filed March 18, 1941   6 Sheets-Sheet 5

Jakob Deutsch
Inventor
By Hearl Benst
His Attorney

Jan. 30, 1945. J. DEUTSCH 2,368,526
CASH REGISTER WITH ATTACHED AUTOMATIC STAMP ISSUING APPARATUS
Filed March 18, 1941 6 Sheets-Sheet 6

Jakob Deutsch
Inventor
By Carl Benst
His Attorney

Patented Jan. 30, 1945

2,368,526

UNITED STATES PATENT OFFICE 2,368,526

CASH REGISTER WITH ATTACHED AUTOMATIC STAMP ISSUING APPARATUS

Jakob Deutsch, Basel, Switzerland, assignor, by mesne assignments, to The National Cash Register Company, Dayton, Ohio, a corporation of Maryland Application March 18, 1941, Serial No. 384,012
In Switzerland February 29, 1940

13 Claims. (Cl. 235—3)

This invention relates to an attachment for a cash register or like machine for automatically issuing pre-printed dividend, refund, and rebate stamps and the like.

In connection with cash registers, mechanism has heretofore been provided to deliver single stamps to the customers, instead of the usual receipt check on which the total amount of a sale is printed. The purpose of issuing such stamps was to allow the amounts which were to be paid out as dividends, or to be refunded, to be ascertained more quickly than is the case when receipt checks are issued by the cash register.

The object of the present invention is to improve such cash registers in such a manner that a receipt check, on which the amounts of the different transactions are printed mechanically in detail, is delivered to the customers, together with dividend, refund, and rebate stamps and the like.

The term "receipt check," bearing detail indications, is understood to mean a receipt printed by a cash register, on which the amounts of the different items of a purchase entitling the customer to an issue of stamps, and the total amount of these purchases, are printed; receipts printed on transactions on which no dividend, refund, or rebate stamps are to be issued, such as net sales amounts, deposit money, and like transactions; and receipts printed on grand total taking of a plurality of transactions.

It is an object of the present invention so to control the pre-printed stamp-issuing mechanism that the value and total number of stamps issued by the novel attachment, which stamps are to be delivered to the customer, will agree with the amounts entered into the machine and recorded on the receipt check issued by the cash register.

It is a specific object of the invention to control the stamp-issuing mechanism automatically from certain elements of the standard cash register, which elements are adjusted to positions commensurate with the value of the items entered into the cash register.

It is a further object of the invention to control the stamp-issuing mechanism so as to prevent issuing stamps during those operations in which no stamps are to be delivered to the customer.

It is a specific object of the invention to throw off the stamp-issuing mechanism by means of mechanism controlled from the cash register keyboard.

The above objects are attained by a self-contained attachment for a cash register, which attachment requires very little modification of the cash register when attached thereto.

In the illustration of the invention, it is shown attached to a machine of the class shown and described in United States Patent No. 2,238,517, issued to Arthur R. Colley and John B. Geers on April 15, 1941.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Of said drawings:

Fig. 5 shows, in a side view, details of the mechanism for displacing an indicator of the cash register in dependency on a depressed key of the keyboard.

General description

The invention disclosed herein is illustrated as applied to a machine of the type which prints and issues both single-item receipt checks and multiple-item receipt checks. Such a machine is herein particularly adapted for use by cooperative stores which allow rebates on certain commodities but no rebates on other commodities. The novel mechanism illustrated herein issues preprinted rebate stamps automatically for those sales, and the items of those sales, on which rebates are allowed. The invention herein includes means controlled by the usual control keys on the cash register keyboard for determining when a rebate stamp is to issue. These controls must be very flexible in order to properly control the issuance of such rebate stamps for all transaction entries. It may be stated broadly that there are five types of transactions which are entered into the machine and which effect the issuance of rebate stamps. These may be tabulated as follows:

1. Single-item transaction—rebate allowed.
2. Single-item transaction—no rebate allowed.
3. Multiple-item transaction—rebate allowed on all items.
4. Multiple-item transaction—no rebate allowed on any item.
5. Multiple-item transaction—rebate allowed on some items—no rebate allowed on other items.

The "Gross" keys (Fig. 7) are used when an item on which a rebate is allowed is entered, and the "Net" keys are used in the entering of an item on which no rebate is allowed.

Figure 8:
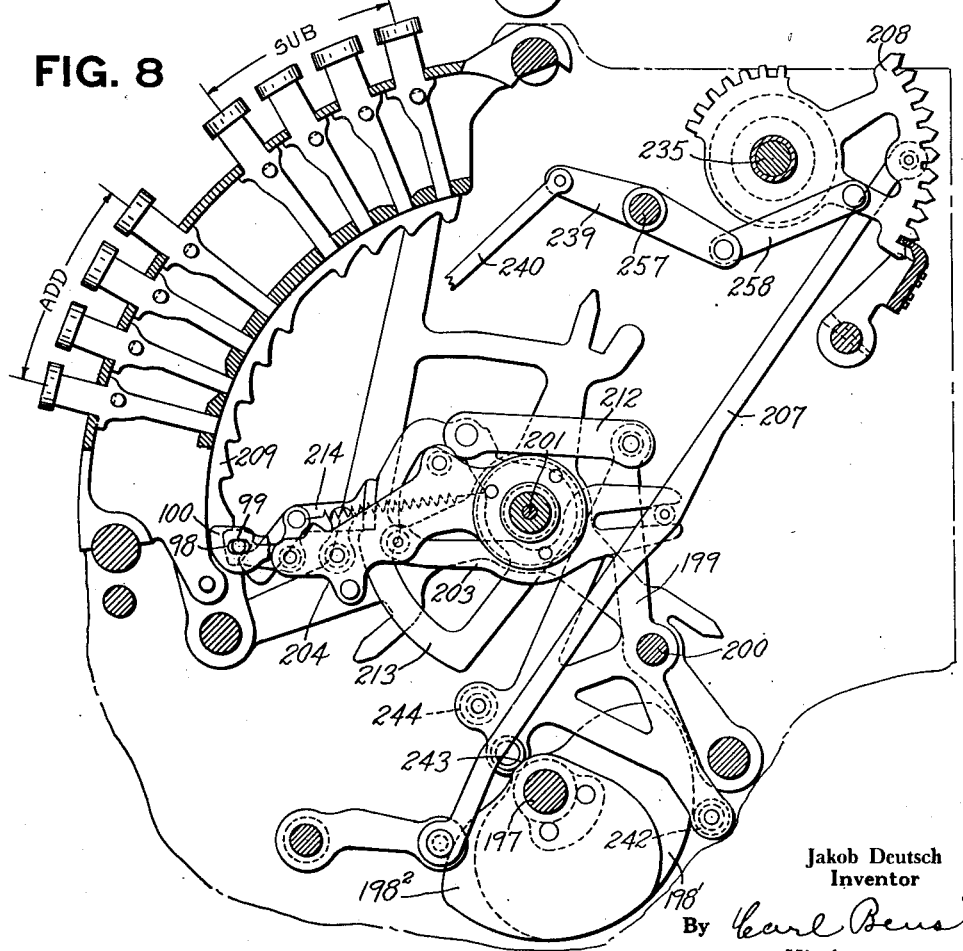
Fig. 8 is a view showing a control bank and the differential mechanisms set thereby, together with certain elements set thereby which effect a control over the issuance of stamps.

The "Sub" keys (Fig. 8) are used when multiple-item transactions are entered, and the "Add" keys are used in the entry of single-item transactions.

A rebate stamp is issued at the time the amount of a single-item transaction is entered into the machine, when said single item is rebatable. However, when a multiple-item transaction is entered, the rebate stamps are not issued during the item entry operation. In this kind of operation, the stamps are issued during a total-taking operation in which the total of the rebatable items is read. Thus, when a multiple-item transaction having both rebatable and non-rebatable items takes place, all the rebatable items are first entered and a sub-total of these items is taken. Thereafter, the non-rebatable items are entered and the grand total of the entire transaction is taken. The rebate stamp issuing means is so controlled that rebate stamps are issued only during the sub-total taking operation of such a mixed multiple-item transaction.

*Detailed description*

Figure 3:
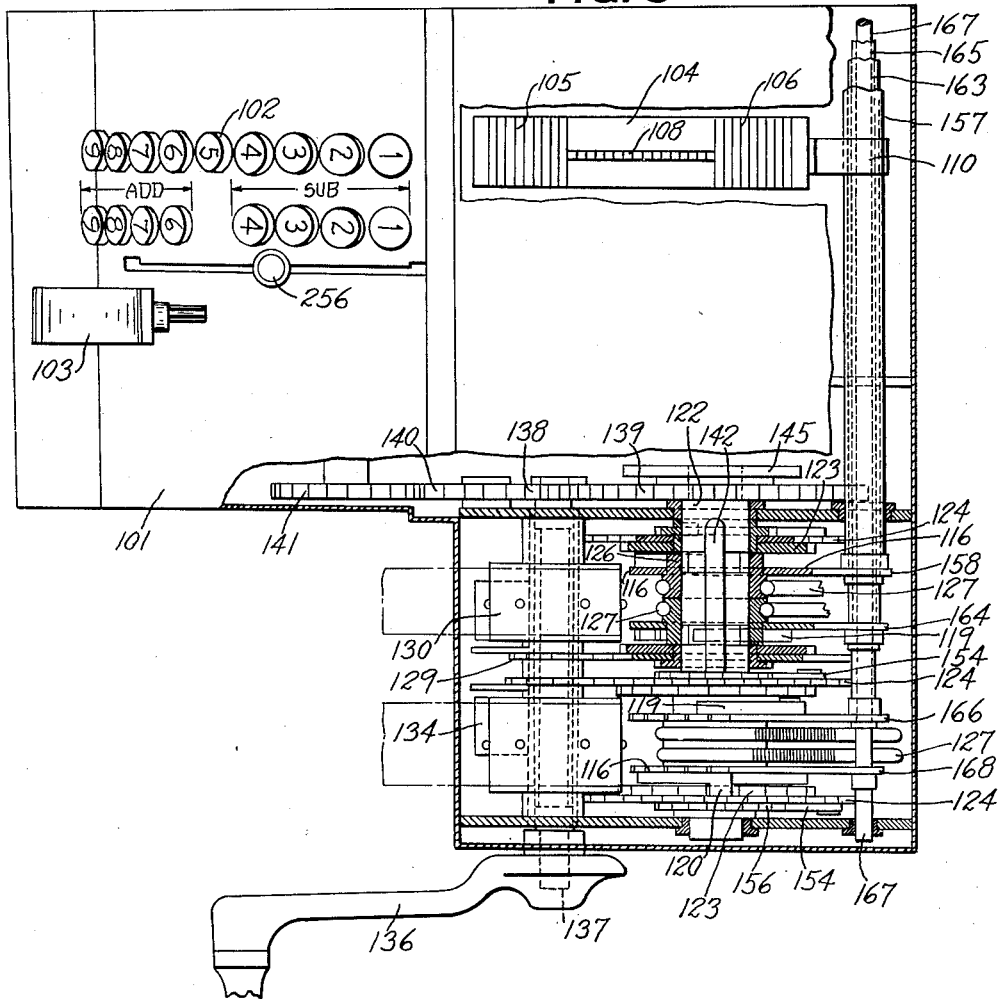
Fig. 3 is a top view partly in section, taken on the line 3—3 in the cash register area and on the line $3^1$—$3^1$ in the stamp-issuing area of Fig. 1, looking in the direction of the arrows.

Referring to the drawings, the numeral 101 (Figs. 1, 3, and 5) denotes the casing of the cash register, and 102 denotes the keys of an amount bank of this register. 103 is a key for controlling the starting of the driving motor of the cash register. Each amount bank controls the setting of an indicator frame 104 comprising two sets of indicating plates 105 and 106. These plates bear numbers, and one of said plate sets is mounted at the front and the other at the back of the cash register. Upon depression of a key of the cash register keyboard, two indicating plates allotted to said key are so displaced at the front and back of the register that the indications on said plates become visible. The mechanism effecting the above operations is shown in detail in Fig. 5, in which 213 denotes a driver pivoted on a shaft 201. This driver 213 influences the position of a latch 214. The driver 213 is actuated by a lever 199 pivoted on a stud 200 and connected by link 212 to the driver 213. The lever 199 carries rollers 242, 243, and 244, the roller 242 bearing against a driving cam 198¹, the roller 243 against a driving cam 198², and the roller 244 against an indicator beam 203. The latter is linked at 201¹ to an actuator 204, which is pivoted on the shaft 201. The above-mentioned latch 214 is provided with a stud 99 projecting into a slot 98 of an arm 100, only a part of which is shown herein. This arm is on the usual reset spider shown and described in the patent issued to B. M. Shipley, No. 1,817,883, on August 4, 1931. The cams 198¹ and 198² are fixed to a main shaft 197, which receives one complete rotation during each machine operation by toothed wheels 138, 140, 141, 241, 216, and 217 from a driving shaft 137, to which further reference is made below. The numeral 207 designates an indicator beam link having a stud 218, which stud is embraced by the bifurcated rear end of the indicator beam 203. The indicator beam link 207 is linked at one end to an indicator liner segment 208. The latter is fixed to a sleeve belonging to a group of sleeves telescoped inside one another. Each of these sleeves is coordinated to a key bank of the register keyboard, and an indicator liner segment 208 is fixed on each of said sleeves. The numeral 215 designates a zero stop lever which can retain the actuator 204 in its zero position. The numeral 209 denotes a notched bar having as many notches as the coordinated amount bank has keys, and an additional notch corresponding to the zero position of the key bank.

Figure 1:
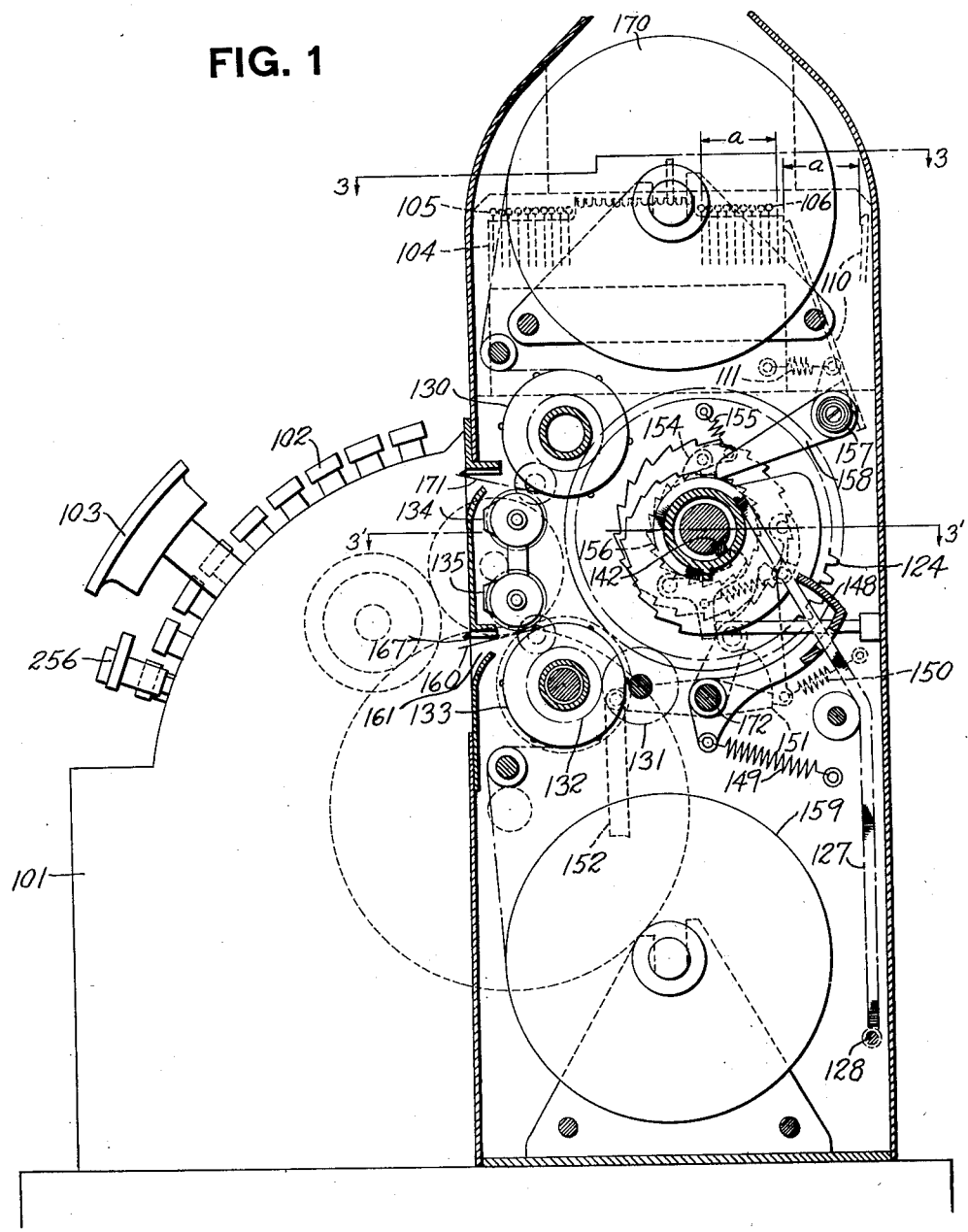
Fig. 1 is a right side view of a cash register with the automatic stamp-issuing apparatus attached thereto.

On depression of a key (for example, key 205 shown in Fig. 5) of the amount bank to which the described mechanism is allotted, and on application of power for operating the register, the driver 213 is rocked clockwise and, through a shoulder 219 thereon coacting with the latch 214, causes the latch to move clockwise therewith until the latch is arrested by the depressed key 205, as is well known in machines of the type shown in the above-named patent. This causes the latch 214 to be unlatched from the driver 213 and the curved forward end thereof to enter one of the notches in the plate 209, to thereby be locked in the unlatched position in the well-known manner. In the position shown in Fig. 5, the driver 213 has travelled to its highest position, which is reached after approximately a one-quarter turn of the driving shaft 197, whereupon it idles for approximately one-half turn of the driving shaft. Since the front end of the indicator beam 203 is swivelled at 201¹ to the actuator 204, the front end of the beam is carried up by the cam disc 198² rotating in the direction of arrow G, and an arcuate central portion of the indicator beam 203 is moved against the hub of the actuator 204, which becomes a point of fulcrum, forcing the rear end of the beam, which is engaging the stud 218, downwardly. This rear end of the indicator beam 203 is bifurcated to engage the stud 218 of the indicator beam link 207, so that the latter is forced down. The indicator beam link 207, being connected to the indicator liner segment 208, rocks the latter into a position corresponding to the position of the latch 214. The segment 208 engages in a toothed rack 210 of the side of the indicator frame 104, running on rollers 211. By these connections, the indicator frame 104 is displaced into a position corresponding to the position of the latch 214 and thus also commensurate with the value of the depressed key of the amount bank. Thereafter, an indicator lifter 212 lifts an indicating target of the set 105 and one of the set 106 to present the proper indicator to the sight openings. All that has been described above in connection with the mechanism shown in Fig. 5 relates to well-known details and operations shown and described in the above-named patents. The essential fact in this connection is that, during the machine operations, the indicator frames 104 are positioned commensurate with the value of the keys depressed. The machin is operated either by a hand crank 136 mounted on a shaft 137 of the cash register or by a motor, not shown, which is started by depression of the key 103. The hand crank is geared to the main shaft 197 by a train of gears, and two turns of the hand crank 136 are required to rotate the main shaft 197 once. Each indicator frame 104 is held in its new position by a locking device 109 cooperating with a toothed rack 108. Against the right-hand end of each indicator frame 104 rests a feeler lever 110 acted upon by a spring 111 (Fig. 1).

The same number of feeler levers 110 is provided as the machine has amount key banks. Sleeves 157, 163, and 165 and shaft 167, respectively, are coordinated to the different feeler levers 110, each of the latter being fixed to the related sleeve or shaft. The sleeves 157, 163, and 165 are telescoped inside one another (see Figs. 1 and 3), and the telescoped sleeves are mounted on shaft 167. Stop levers 158, 164, and 166 are fixed to the ends of the sleeves 157, 163, and 165, respectively, and stop lever 168 is fixed to the end of shaft 167, which is adjacent the automatic stamp-issuing apparatus. When one of the levers 110 is adjusted by an indicator frame 104, its coordinated stop lever is swung through the same angle. Stop discs 116 coact with the ends of said levers 158, 164, 166, and 168.

Since the control mechanism for controlling the stamps to be issued is the same for each amount bank of the machine, and since certain parts of the stamp-issuing apparatus are duplicated as many times as the cash register has amount banks. the construction and operation of only one of these control mechanisms will be described hereinafter in all its details; namely, the mechanism coordinated to the amount bank for the values of 1 to 9 cents. For the purpose of this description, it is assumed that the above-mentioned feeler lever 110 and the stop disc 116 shown on the drawings are allotted to this mechanism.

Figure 4:
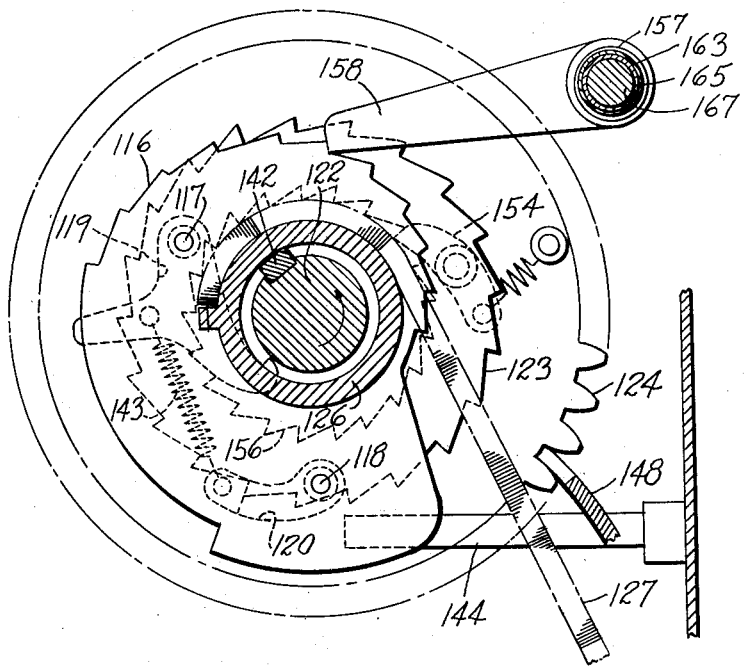
Fig. 4 is an enlarged view of certain parts of the stamp-issuing apparatus with the parts in moved position.

The stop disc 116 carries on pins 117 and 118 a drag pawl 119 and a feed pawl 120, respectively (see particularly Fig. 4). A ratchet wheel 123 and a driving wheel 124, secured together to rotate as a unit, are loosely mounted on the hub of a ratchet wheel 156 fixed to the driving shaft 122 of the automatic stamp-issuing apparatus. On the driving shaft 122 is loosely mounted a spring-carrying ring 126, around which is wound a spring 127. One end of this spring 127 is fixed to the ring 126 and the other end to a pin 128 (Fig. 1). The stop disc 116 is rigidly connected to the spring-carrying ring 126. The wheel 124 drives, through gear wheels 131 and 132, a feed roller 133 for a stamp strip 160, which strip is fed from a roll 159.

In this connection, it may be mentioned that, in order to achieve a compact arrangement of four feed rollers required for four strips allotted to four amount key banks—i. e.. a cents bank. a tens bank. a units of dollars bark, and a tens of dollars bank—two of said rollers are arranged above and two below the driving shaft 122 of the automatic apparatus. In Fig. 1, the numeral 130 denotes a feed roller of the upper group; this roller 130 unrolls a stamp strip 171 from a roll 170. With such an arrangement of the feed rollers for the stamp strips, the overall length of the automatic stamp-issuing apparatus can be reduced to a minimum. The number of stamps fed out of the apparatus by the feed rollers 130 and 133 is registered by counters 134 and 135 (Fig. 1), respectively, so that the total number of stamps issued can be determined.

Figure 2:
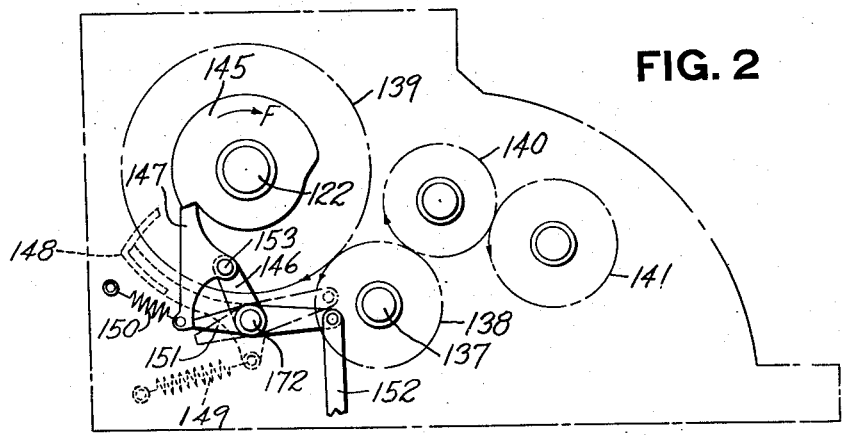
Fig. 2 is a rear view of certain parts of the automatic stamp-issuing apparatus shown in Fig. 1, and these parts are shown in their positions before the cash register is operated.
Figure 6:
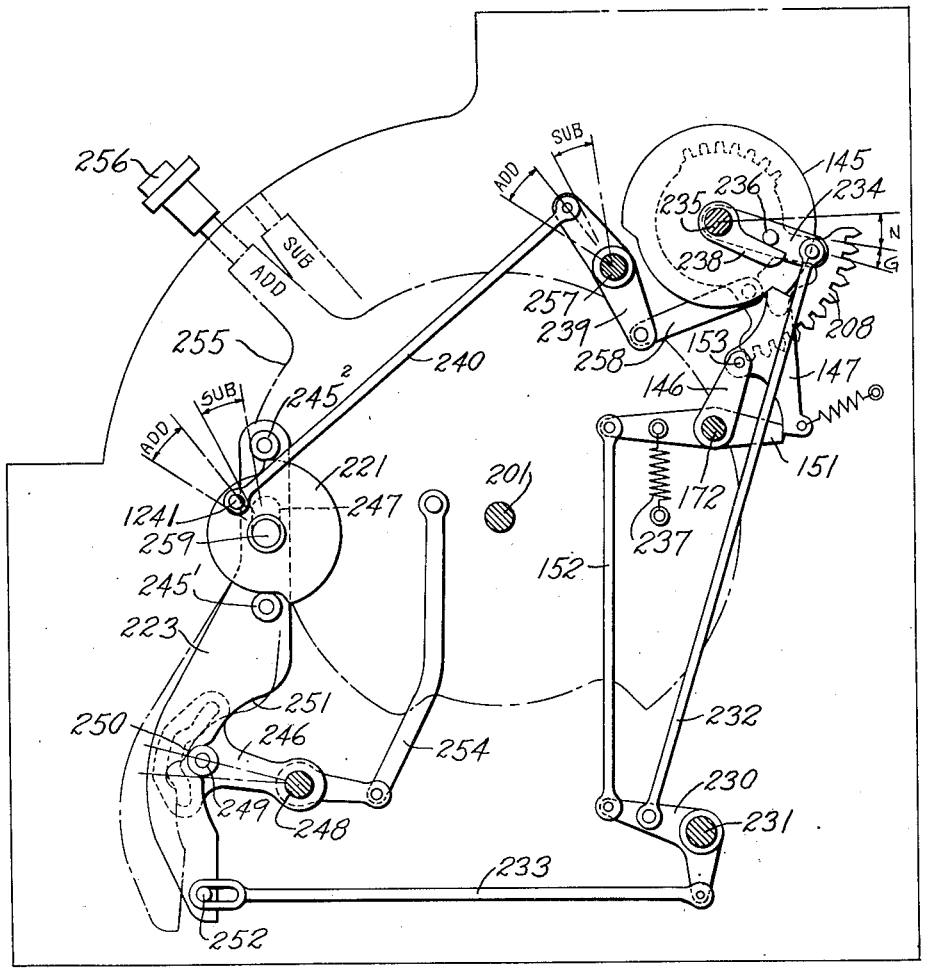
Fig. 6 shows, on an enlarged scale, details of the mechanism for controlling the issue of stamps.

The crank 136 (Fig. 3) for the operation of the cash register by hand is fixed to a shaft 137, on which is mounted a toothed wheel 138 (Figs. 1 and 2) meshing with a toothed wheel 139. This shaft 137 also drives the cash register through gear wheels, as shown in the above-named patent to Colley and Geers. On the other hand, the driving motor, also not illustrated, of the cash register operates, when it has been switched on, the gears 139 through the gears 141 and 140. The gear 139 is fixed to the driving shaft 122 of the automatic stamp-issuing apparatus. A carrier key 142 (Figs. 1 and 4) for cooperating with the drag pawl 119 is also fixed to this shaft 122. A spring 143 tends to press the drag pawl 119 against the shaft 122 and the feed pawl 120 against the ratchet wheel 123. The reference numeral 144 designates a stop pin for the drag pawl 119, the latter bearing against the pin 144 when it is in its thrown-out, or normal, position. The numeral 145 (Figs. 2, 3, and 6) designates a cam disc serving to operate a control pawl 147 fulcrumed on a pin 153 of a lever 146, which in its turn is fixed to a shaft 172. To the latter is also fixed a control lever 148 provided with a flange having two extensions of different length, the longer one of which cooperates with the stop disc 116 (Fig. 1) and the shorter one with the driving wheel 124 (Fig. 4) to normally maintain them in locked condition. A spring 149 tends to keep the lever 148 in its locking position, and a spring 150 tends to press the control pawl 147 against the cam disc 145. A lever 151 loosely mounted on the shaft 172 acts as a stop for the control pawl 147 and is linked to a rod 152 adjusted by mechanism controlled by a depressed control key of the keyboard of the cash register. When keys are depressed which correspond to a transaction not requiring the issue of any stamps, the rod 152 is displaced in such a manner that the pawl 147 is no longer arrested by the lever 151, so that it is then free to rock about the pivot 153. If, on the other hand, stamps are to be issued, the rod 152 positions the lever 151 into the full-line position of Fig. 2, so that it acts as a stop for the control pawl 147. The mechanism controlling the displacement of the rod 152, and thus the issue of stamps, is as follows:

As shown in Fig. 6, the rod 152 is also linked to a bell crank lever 230 pivoted on a stud 231. To a horizontal arm of the lever 230, to which the rod 152 is connected, a second rod 232 is also connected. To the vertical arm of said lever 230 is connected a rod 233, the opposite end of which is loop-shaped. The rod 232 is further connected to an arm 234 loosely mounted on a shaft 235. The arm 234 has a stud 236, which, by the action of a spring 237 acting on lever 151, connecting rod 152, bell crank lever 230, and rod 232, is pressed against an arm 238 fixed to the shaft 235.

Figure 7:
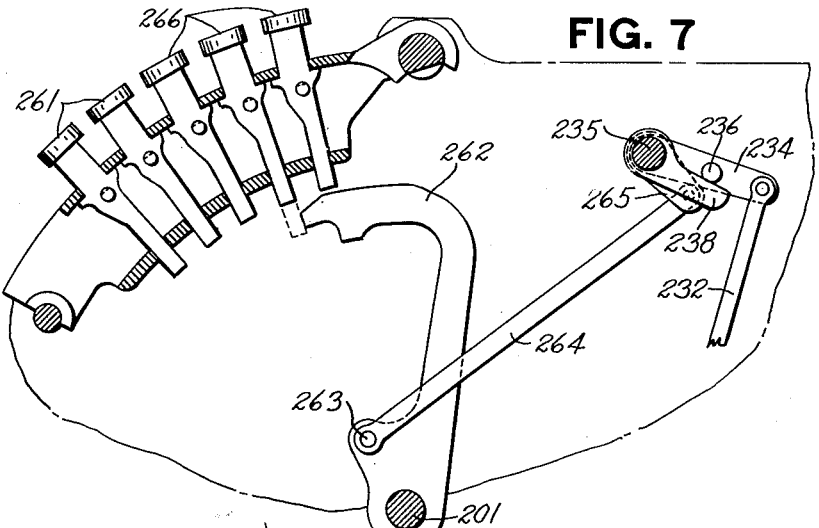
Fig. 7 is a view showing one means for controlling the issuance of stamps from a special key bank.

This shaft 235 is differentially adjusted under control of the "Gross" and "Net" key bank (Fig. 7).

A bell crank lever 239 is loosely pivoted on a stud 257, and to this lever 239 is linked a rod 240, connected at the other end to a stud 1241 of a cam disc 221. The bell crank lever 239 is also connected by a link 258 to the indicator liner segment 208. The numeral 223 designates a pitman carrying two rollers $245^1$ and $245^2$ cooperat- The pitman 223 has also a slot 247 coacting with the stud 259 of the cam disc 221 in such a manner as to be guided thereby in its movements. The pitman 223 can be displaced by the roller 245² and the cam disc 221 into an upper position, and by the roller 245¹ and the cam disc 221 into a lower position. The numeral 246 designates a segment pivoted on a stud 248 and carrying a roller 249, the latter cooperating with a curved track 251 of the pitman 223. The track 251 has a recess 250, and the pitman 223 has a stud 252 projecting into the loop-shaped end of the rod 253. To an arm of the segment 246 is linked a connecting rod 254, the latter being also connected to the disc 255 of the "totalizing lever" 256. The disc 255 is mounted on the shaft 201 mentioned above.

In Fig. 7, the numeral 261 denotes "gross sales" keys and the numeral 266 denotes "net sales" keys. The reference numeral 262 designates a stop arm cooperating with the key 261 or 266 which has been depressed, to be differentially adjusted under control thereof. This stop arm 262 can be rotated on the shaft 201 in the manner described in the above-named Colley and Geers patent. A rod 264 pivoted on stud 263 of the stop arm 262 connects the said stop arm to a lever 265 fixed to the indicator shaft 235, to which the arm 238 is rigidly connected.

In order to insure that stamps are issued only when the driving shaft 122 of the stamp-issuing apparatus is actuated, each of the driving wheels 124 allotted to the different amount key banks carries a pawl 154 (Figs. 1, 3, and 4), which is permanently pressed by a spring 155 against the above-mentioned ratchet wheel 156 fixed to the driving shaft 122.

The constructional form of the invention illustrated in Figs. 1 to 8 operates as follows:

Let it be assumed, by way of example, that the key 205 (Fig. 5) corresponding to "5 cents" of the amount bank for the values of 1 to 9 cents, to which bank the feeler lever 110 is allotted, has been depressed and that the cash register is thereupon operated by means of the hand crank 136. During the first part of the two turns carried out by the hand crank, the cam disc 145 (Fig. 2), operated by the gear 139, is moved in the direction of arrow F, whereby, in the course of this rotation, the control pawl 147 is displaced from the part of this cam 145 having the smaller radius to that of larger radius. At the same time, the allotted indicator frame 104 is moved, in a manner hereinbefore described, from the position shown in Fig. 1 to the right by 5/9 of the maximum possible stretch a (the latter is for the values 0 to 9 cents subdivided into nine equal parts) and acts thereby on the feeler lever 110 so that the sleeve 157 is turned to such an extent that the stop lever 158, fixed to this shaft, is rocked from the position shown in Fig. 1 to that illustrated in Fig. 4. In the latter position, the stop lever does not, at first, engage the stop disc 116, since at this time the stop disc is still held in its normal position, shown in Fig. 1, by the lever 148. In the meantime, the part of the cam disc 145 having the larger radius has been moved into contact with the control pawl 147 and now causes the lever 146 and therefore also the control lever 148 (the latter is fixed to the same shaft 172 as lever 146) to swing, with the shaft 172 as a pivot, through such an angle that both the stop disc 116 and the driving wheel 124 are released. The spring 127 (Fig. 4) then rotates the spring-carrying ring 126, and also the stop disc 116 rigidly fixed thereto, in the opposite direction to that indicated by arrow F until arrested by the engagement of one of the shoulders thereon with the stop arm 158, as shown in Fig. 4.

During this movement of the stop disc 116, the feed pawl 120 ratchets over the teeth of the ratchet wheel 123, which ratchet wheel is secured to the gear 124. In this manner, the stop disc 116 is set out of its normal position by five steps, which is commensurate with the value of the amount keys 102 which has been depressed.

After the control disc 116 has been set, under control of the stop arm 158, to represent the value of the key depressed, the shaft 122, carrying key 142, rotating in a counter-clockwise direction indicated by the arrow (Figs. 1 and 4), engages the nose of the pawl 119 and carries it in a counter-clockwise direction towards its home position. The pawl 119, being pivoted on the control disc 116, carries the control disc therewith to its home position, and the control disc 116 in turn carries the feed pawl 120 to its home position. During the movement of the feed pawl 120 to its home position, the tooth thereon, engaging the ratchet wheel 123, rotates the wheel 123 an extent equal to the extent of movement of the control disc 116, which movement in the example used herein is five steps.

Rotation of the ratchet wheel 123 carries the gear 124, connected therewith, five steps, which in turn operates, through the intermediary of the gears 131 and 132, the feed roller 133 for the stamp strip taken from the paper roll 159. A suitable transmission ratio having been chosen for the gears, the roller 133 is rotated by such an amount that the stamp strip 160, passing over it, is advanced by such an extent that a number of stamps corresponding to the value of the depressed key is issued at the outlet opening 161 of the automatic apparatus. This strip of stamps is then severed from strip 160 by being torn off against a stationary knife 167.

In an analogous manner, stamps corresponding to the amounts set up on the other key banks are issued; i. e., the stamps for the amounts set up on the ten-cents bank, as also on the tens and units dollar banks, respectively. In this way, the total amount of the stamps delivered corresponds exactly to the total of those amounts impressed on the receipt check in those transactions in which stamps are to be issued. The number of stamps issued is counted by the counters 134 and 135, so that the total value of all the stamps issued can be compared at any time with the issued receipt checks. By means of said counters, it is also possible to ascertain at any time how many stamps are still on the supply rolls.

No stamps are to be issued during certain kinds of transactions. In such transactions, the rod 152 (Figs. 1 and 2), connected to the lever 151, is moved in such a manner that this lever is brought into the position shown by dot-and-dash lines in Fig. 2, in which it no longer acts as a rest for the pawl 147. Such a movement of the rod 152 is brought about, in a manner hereinafter described, by depression of certain control keys of the cash register. When the lever 151 has been rocked into the position shown by the dot-and-dash lines in Fig. 2, and on the cam disc 145 being rotated in the direction of arrow F, the pawl 147 is free to rock on the pin 153 (see Fig. 2), whereby the movement of this pawl 147 no longer influences the position of the lever 146 and consequently also that of the control lever 148.

The stop disc 116 and the feed wheel 124 therefore remain locked. However, during an operation in which no stamp is to be issued, the stop levers 158, 164, 166, and 168 are nevertheless moved by an extent corresponding to the actual displacement imparted to the indicator frames 104. During such operations, when the shaft 122 rotates, the carrier key 142 fixed thereto moves past the nose of the drag pawl 119 without influencing the latter, because at this time the pawl 119 bears against the stop pin 144 and the nose of the pawl is held outside the path of the key 142.

The above-mentioned rocking of the lever 151 is brought about in the following manner:

Let it be assumed, for instance, that stamps are to be issued when a gross sale amount is to be registered. In this case, one of the keys 261 (Fig. 7) is depressed, and, in the course of the operation of the cash register, the arm 262 is rocked counter-clockwise, in the manner described in the above-mentioned Patent No. 2,238,517, until arrested by the depressed key 261. This movement of arm 262 is transmitted to arm 238 by the connections including rod 264, arm 265, and shaft 235. As a result hereof, the spring 237 is able to move the lever 234 in a clockwise direction (Fig. 6) by means of rod 232, bell crank lever 230, and rod 152, so that the lever 151 is moved into the position shown in full lines (Figs. 2 and 6), thus permitting a stamp issue. On the other hand, when a "net" key 266 is depressed, the arm 238 is moved by the rod 264, the arm 265 and the shaft 235 to the position corresponding to the position of the depressed key 266, and the lever 234 is stopped in a corresponding position. This causes the rod 232, the bell crank lever 230, and the rod 152 to position lever 151 to the chain-line position shown in Fig. 2, so that the pawl 147 is free to rock on the pin 153, and no issue of stamps can take place.

When one of the "Add" keys (Fig. 8) is depressed, the issue of stamps takes place as long as the "totalizing lever" 256 is in its normal "add" position. Let it be assumed that an "Add" key is depressed and that power is applied to the cash register. Operation of the machine through the usual differential mechanism, shown and described in the above-named Patent No. 2,238,517 and illustrated in Fig. 8 herein, differentially positions a beam link 207, connected at its upper end to the indicator segment 208 for this bank of keys, into a position determined by the depressed key. Reference numerals like those used in describing the operation of the amount differential (Fig. 5) have been applied to the control differential, and the same description applies to both mechanisms. A link 258 connects the indicator segment 208 for this bank to the lever 239. The lever 239 is thus swung within the range "add" (Fig. 6), and the rod 240, linked to pin 1241, rotates the cam disc 221 within its range "add" (Fig. 6), whereby the pitman 223 is positioned into the full-line position (Fig. 6) by the roller 245². With the "totalizing lever" 256 in its "add" position, the notch 250 of the pitman remains in contact with the stationary roller 249, so that the lever 151 is not displaced by rod 233, bell crank lever 230, and rod 152. However, as soon as the "totalizing lever" 256 is moved out of its normal "add" position into its "Sub-total" position, the segment 246 will also be moved out of its "add" position, whereby the roller 249, acting on the track 251 of pitman 223, rocks the pitman to the left (Fig. 6) and, through stud 252, rod 233, bell crank lever 230, and rod 152, moves the arm 151 to the chain-line position (Fig. 2) to control the apparatus so that no issue of stamps takes place.

If one of the "Sub" keys (Fig. 6) is depressed, no stamps can issue as long as the total lever is in the "add" position. Depression of a "Sub" key controls the positioning of the lever 239, by the mechanism just described, to cause the rod 240 to rotate the cam disc 221 into its range "Sub." The pitman 223 is thereby moved into its lower position by roller 245¹, and, with the "totalizing lever" 256 in the "add" position, the roller 249, coacting with the track 251, forces the pitman 223 to the left to the chain-line position (Fig. 6). The rod 233 thereby moves the lever 151 into the position where it prevents a further issue of stamps. As soon as the "totalizing lever" 256 is moved into its "Sub-total" position, the roller 249 falls into the recess 250 and thereby permits the spring 237 to restore the lever 151 to its full-line or effective position.

*Summary of operations*

A brief summary of the operations of the machine in entering each of the five types of operations listed in the "General description," as applied to machines used in cooperative stores, is as follows:

1. Single-item transactions—rebate allowed. In the entry of a single-item transaction on which a rebate is allowed, a "Gross" key 261 (Fig. 7) and an "Add" key (Fig. 8) are depressed and the total lever 256 (Fig. 6) remains in the "Add" position. During the operation of the machine, the differentially settable stop arm 262 (Fig. 7) permits movement of the lever 151 into the position shown in Fig. 6, in engagement with the lower end of control pawl 147. Also during this operation, the "Add" key (Fig. 8) controls the setting of the cam 221 so as to maintain the pitman 223 in the upper position, and, since the total lever 256 is in its "Add" position, the roller 249 remains in the notch of the pitman 223. With the parts in these positions, the control arm 147 (Fig. 2), when actuated by the cam 145, rocks the shaft 172 and withdraws the control lever 148 (Fig. 4) from engagement with the gear 124 to permit the rebate stamp issuing mechanism to operate.

2. Single-item transaction—no rebate allowed. In the entry of a single-item transaction on which no rebate is allowed, a "Net" key 266 (Fig. 7) and an "Add" key (Fig. 8) are depressed and the total lever 256 (Fig. 6) remains in the "Add" position. During the operation of the machine, the differentially settable stop arm 262 (Fig. 7) arrests the lever 151 in the chain line position shown in Fig. 2, wherein said lever 151 is out of the path of the lower end of the control pawl 147. Also during this operation, the "Add" key (Fig. 8) controls the setting of the cam 221 so as to maintain the pitman 223 in the upper position, and, since the total lever 256 is in its "Add" position, the roller 249 remains in the notch of the pitman 223. With the parts in these positions, the control arm 147 (Fig. 2), when actuated by the cam 145, rocks idly on the stud 153, and therefore the control lever 148 (Fig. 4) remains in position to prevent rotation of the gear 124, and the rebate stamp issuing mechanism is not actuated.

3. Multiple-item transaction—rebate allowed on all items. In the entry of a multiple-item transaction on which a rebate is allowed on all the items of the transaction, a "Gross" key 261 (Fig. 7) and a "Sub" key (Fig. 8) are depressed, and the total lever 256 (Fig. 6) remains in the "Add" position. During each item entry operation of such multiple items, the differentially settable stop arm 262 (Fig. 7) is arrested by the depressed "Gross" key 261 in a position wherein the lever 151 would be in position in engagement with the lower arm of the control pawl 147. However, during this operation, the "Sub" key (Fig. 8) controls the setting of cam 221 (Fig. 6) to cause the latter to lower the pitman 223, and, since the total lever 256 is held in the "Add" position, the pitman 223, when lowered, is carried leftwardly (Fig. 6) into the chain-line position. This leftward movement of the pitman 223, by its stud 252, link 233, bell crank 230, and rod 152, withdraws the lever 151 from engagement with the control pawl 147 and in this manner supersedes the control over the control pawl 147 by the "Gross" key 261. With the parts in these positions, the control arm 147 (Fig. 2), when actuated by the cam 145, rocks idly on the stud 153, and therefore the control lever 148 (Fig. 4) remains in position to prevent rotation of the gear 124, and the rebate stamp issuing mechanism is not actuated. This control is repeated for the entry of each item of a multiple-item transaction, so that no rebate stamps are issued during the multiple-item entry operations.

However, when the total of the above items is to be recorded, the total lever 256 (Fig. 6) is moved into the "Sub" position, which movement, through link 254, rocks lever 246 counter-clockwise (Fig. 6) to position the roller 249 thereon into the path of the notch in the pitman 223, to permit the spring 237 to move said pitman 223 back into its full-line position and thereby move the lever 151 into the path of the lower arm of the control pawl 147. Such positioning of the lever 151 at this time is controlled by the position of arm 238, which is in the position to which it was set under control of the "Gross" key 261 during the last item entry operation. With the parts in these positions, the control arm 147 (Fig. 2), when actuated by the cam 145 during the total-taking operation, rocks the shaft 172 and withdraws the control lever 148 (Fig. 4) from engagement with the gear 124, to permit the rebate stamp issuing mechanism to operate and issue stamps in accordance with the value of the total set up on the indicators.

4. Multiple-item transaction—no rebate allowed on any item. In the entry of a multiple-item transaction in which no rebate is allowed on any item, the operation is the same as explained in heading 3, except that, when such a transaction is entered, a "Net" key 266 (Fig. 7) is depressed instead of a "Gross" key 261. During such item-entry operations, the stop arm 262 is set to raise the arm 234 (Fig. 6) into one of its upper positions (N, Fig. 6). This withdraws the lever 151 from engagement with the lower arm of the control pawl 147. Also during this operation, the "Sub" key (Fig. 8), in combination with roller 249 (Fig. 6), controls the setting of the cam 221 to rock the pitman to the chain-line position (Fig. 6) into a position wherein the rod 233 is shifted to the left (Fig. 6). However, since the "Net" key also acts to shift this rod to such left position, both keys act to move the rod 233 to the same position. This position of the rod 233 is such that the lever 151 is out of engagement with the lower arm of the control pawl 147. With the parts in these positions, the control pawl 147 (Fig. 2), when actuated by the cam 145, rocks idly on the stud 153, and therefore the control lever 148 (Fig. 4) remains in position to prevent rotation of the gear 124, and the rebate stamp issuing mechanism is not actuated. This control is repeated for entering each item of a multiple-item transaction, so that no rebate stamps are issued when the items of the transaction are entered.

When the machine is adjusted for taking a total of the items of said multiple-item transaction, the total lever 256 is moved to the "Sub" position (Fig. 6). When the lever 256 is so adjusted, the roller 249 is positioned to permit the pitman 223 to move back to its full-line position. This movement of the pitman is idle, since the rod 233 is in its left-hand position, and therefore the stud 252 of the pitman rides idly in the slot of the rod 233. During the total-taking operation following this setting of the total lever, no rebate stamp is issued, since the lever 151 remains out of engagement with the control pawl 147. Then, when cam 145 rocks the control pawl 147, the latter rocks idly on its pivot 153, and the control lever 148 maintains the rebate stamp issuing mechanism in inactive condition.

5. Multiple-item transactions—rebate allowed on some items and no rebate allowed on other items. In the entry of a multiple-item transaction consisting of a plurality of items on which a rebate is allowed and a plurality of items on which no rebate is allowed, all the items on which a rebate is allowed are entered first. The machine is controlled and operates in the same manner as when entering a multiple-item transaction on which a rebate is allowed on all items, as explained in heading 3. As explained above, in such item-entering operations no rebate stamps are issued. After all of said first group of items have been entered, the total lever 256 is moved to the "Sub" position to obtain a subtotal of the items, and, during such operation, rebate stamps are issued commensurate with the value of said subtotal. Thereafter, the non-rebatable items are entered and a total is taken in the same manner as explained under heading 4.

Since, in the described constructional form of the invention, the controlling movements of the automatic stamp-issuing apparatus are derived directly from the position of the indicators of the cash register, only very little energy has to be exerted for operating the automatic apparatus, whereby the number of components is reduced to a minimum and no alterations have to be made to the cash register other than connecting the controls between the old and the new mechanisms.

The automatic apparatus can be designed so as to issue stamps even down to a value of one cent.

In view of the fact that the purchaser receives a receipt check from the cash register and at the same time receives stamps from the automatic apparatus, a further check compelling the sales clerk to register the transactions correctly is provided, since the purchaser, who is interested in the dividend, refund, or the like, will see that the amounts to be recorded are properly set up on the cash register.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What I claim is:

1. In a machine of the class described, the combination of differentially settable amount display means; control means coacting with the amount display means and adjustable thereby into a position commensurate with the differential setting of the display means; a spring-actuated differential device coacting with the control means whereby the spring-actuated device is differentially adjusted commensurate with the adjustment of the control means; a feeding means to feed a pre-printed strip of stamps; a pawl-and-ratchet connection between the feeding means and the spring-actuated device, the said connection being so constructed that the pawl is ineffective to feed when the spring-actuated device is differentially adjusted under control of the control device, said pawl-and-ratchet connection effective when the spring-actuated device is restored to its original position; and operating means effective after the spring-actuated device has been differentially adjusted to restore the spring-actuated device to its original position to thereby operate the pawl-and-ratchet connection and the feeding means to feed a number of stamps commensurate with the setting of the indicating means.

2. In a ticket-issuing machine, amount-determining manipulative devices; a stop differentially positioned under control of the manipulative devices to position the stop in accordance with the value of the manipulative devices; a spring-actuated differential device having thereon a plurality of shoulders, which shoulders are located in such a manner that a different shoulder coacts with the stop for each position of the stop to thereby determine the extent of movement of the differential device; means to restrain the differential device in a home position until after the stop is positioned under control of the manipulative devices; means to withdraw the last-named means to release the differential device to the action of its spring; operating means to return the differential device to home position after being positioned under control of said stop; a stamp-issuing mechanism; and a one-way driving connection between the differential device and the issuing mechanism effective only while the differential device is being moved from the differentially adjusted position to home position to feed the issuing mechanism, the extent of movement transmitted to the issuing mechanism being commensurate with the value of the manipulative device which is operated to issue a number of stamps commensurate with the value of the operated manipulative device.

3. In an attachment for a cash register or like machine having transaction control keys, amount keys, indicating means for indicating the value of amounts set up on the amount keys, and means controlled by the amount keys to adjust the indicating means for display, the combination of a differential means; operating means for the differential means; a feeling device coacting with the indicating means to be set thereby to control the differential movement of the differential means; means normally arresting the differential means in home position; and means controlled by operation of the transaction control keys to operate the arresting means to thereby release the differential means when certain of said control keys are operated, and to prevent operation of the arresting means to thereby prevent the release of the differential means when others of said transaction control keys are operated.

4. In a cash register or like machine having amount display indicating means, and means to adjust the indicating means to display an amount, the combination of a spring-actuated differentially settable device; means normally maintaining the differentially settable device in home position; control means to selectively operate the maintaining means to release the differentially settable device during certain operations and to prevent the operation of the maintaining means during other operations; a control means settable under control of the indicating means to determine the extent of movement of the differentially settable device when released; means to return the differentially settable device to its original home position after having been set under control of the control device; a record feed means; and a one-way connection between the feed means and the differential device constructed so as to cause no feeding of the feed device when the differential is set under control of the control member and to cause the feed means to be operated by the differential means when being returned to its original position to actuate the feed means an extent commensurate with the setting of the differential means under control of the indicating means.

5. In a cash register or like machine having amount display indicators mounted in a carriage in a single group, and means to move the carriage to select an indicator from the group for display, the combination of a pre-printed ticket issuing mechanism; a differential means to actuate the ticket issuing mechanism different extents to issue a variable number of said tickets; means to control the extent of movement of the differential means including a stop member adjusted by the indicator carriage into a position commensurate with the value of the selected indicator in the carriage; means normally engaging the differential means to hold it in a home position; a power-operated means to withdraw the holding means, said power-operated means including a toggle joint; a device cooperable with the toggle joint to cause the said joint to be effective to cause the holding means to be withdrawn; and selectively controlled means to withdraw the said device from cooperation with the toggle joint to render the power-operated means ineffective to thereby prevent withdrawal of the holding means and the issuance of tickets.

6. In a cash register or like machine having a group of value indicators mounted in a carriage, means to differentially adjust the carriage for selecting an indicator to be displayed, and main operating means to operate the machine through cycles of operation, the combination of ticket-issuing mechanism for issuing a variable number of tickets during single cycles of operation of the machine, said ticket issuing mechanism and carriage being operated during the same single cycle; a differential means comprising a stepped disc having a plurality of shoulders on the periphery thereof arranged in the form of a spiral; a stop set under control of the indicator carriage to coact with the shoulder representing the value of the selected indicator; means to rotate the disc until arrested by the stop; means to thereafter restore the disc to its original position; and a means operated by the main operating means during a single cycle of operation to actuate the ticket-issuing mechanism during one of said movements of the disc to issue a number of tickets commensurate with the value of the selected indicator.

7. In a cash register or like machine having a group of value indicators mounted in a carriage, and means to differentially adjust the carriage for selecting an indicator to be displayed, the combination of ticket-issuing mechanism for issuing a variable number of tickets during an operation of the machine; a differential means comprising a stepped disc having a plurality of shoulders on the periphery thereof arranged in the form of a spiral; a stop set under control of the indicator carriage to coact with the shoulder representing the value of the selected indicator; means to rotate the disc until arrested by the stop; means to thereafter restore the disc to its original position; said last-named means including a rotatable shaft having thereon a shoulder engaging a pawl on the disc; a second pawl on the disc engageable with a ratchet to rotate the ratchet when the disc is returned to its original position; and a means actuated by the ratchet to operate the ticket-issuing means to issue a number of tickets commensurate with the value of the indicator selected.

8. In a cash register or like machine having a group of value indicators mounted in a carriage, and means to differentially adjust the carriage for selecting an indicator to be displayed, the combination of ticket-issuing mechanism for issuing a variable number of tickets during an operation of the machine; a differential means comprising a stepped disc having on the periphery thereof a plurality of shoulders arranged in the form of a spiral; a stop set under control of the indicator carriage to coact with the shoulder representing the value of the selected indicator; means to rotate the disc until arrested by the stop; means to thereafter restore the disc to its original position, said last-named means including a rotatable shaft having thereon a shoulder engaging a pawl on the disc; a second pawl on the disc engageable with a ratchet to rotate the ratchet when the disc is returned to its original position; a means actuated by the ratchet to operate the ticket-issuing means to issue a number of tickets commensurate with the value of the indicator selected; and means to withdraw the first-named pawl from the shoulder when the said number of tickets have been issued.

9. In a cash register or like machine having a plurality of manipulative devices, a settable device, and means controlled by the manipulative devices to set the settable device into a position corresponding to the manipulated manipulative device, the combination of a pre-printed ticket issuing mechanism; a differential means to actuate the ticket issuing mechanism different extents to issue a variable number of said tickets; means to control the extent of movement of the differential means including a stop member adjusted by the settable device commensurate with the position to which the settable device is set; means normally engaging the differential means to hold it in a home position; a power-operated means to withdraw the holding means, said power-operated means including a toggle joint; a device cooperable with the toggle joint to cause the said joint to be effective to cause the holding means to be withdrawn; and selectively controlled means to withdraw the said device from cooperation with the toggle joint to render the power-operated means ineffective to thereby prevent withdrawal of the holding means and the issuance of tickets.

10. In a cash register or like machine having an adjustable amount display indicator, the combination of a pre-printed ticket issuing mechanism; a differential means to actuate the ticket issuing mechanism different extents to issue a variable number of said tickets; means to control the extent of movement of the differential means including a stop member adjusted by the indicator commensurate with the value of the selected indicator position; means normally engaging the differential means to hold it in a home position; a power-operated means to withdraw the holding means, said power-operated means including a toggle joint; a device cooperable with the toggle joint to cause the said joint to be effective to cause the holding means to be withdrawn; and selectively controlled means to withdraw the said device from cooperation with the toggle joint to render the power-operated means ineffective to thereby prevent withdrawal of the holding means and the issuance of tickets.

11. In a cash register or like machine having an indicator to be displayed, and means to adjust the indicator, the combination of ticket issuing mechanism for issuing a variable number of tickets during an operation of the machine; a differential means comprising a stepped disc having on the periphery thereof a plurality of shoulders arranged in the form of a spiral; a stop set under control of the indicator adjusting means to coact with the shoulder representing the value displayed by the adjusted indicator; means to rotate the disc until arrested by the stop; means to thereafter restore the disc to its original position; said last-named means including a rotatable shaft having thereon a shoulder engaging a pawl on the disc; a second pawl on the disc engageable with a ratchet to rotate the ratchet when the disc is returned to its original position; and a means actuated by the ratchet to operate the ticket issuing means to issue a number of tickets commensurate with the value displayed on the indicator.

12. In a machine of the class described, the combination of a differentially settable device, settable to represent different data; ticket issuing mechanism for issuing a variable number of tickets during an operation of the machine; a differential means comprising a stepped disc having a plurality of shoulders on the periphery thereof arranged in the form of a spiral; a stop set under control of the differentially settable device to coact with the shoulder representing the position to which the settable device is differentially set; means to rotate the disc until arrested by the stop; means to thereafter restore the disc to its original position; said last-named means including a rotatable shaft having thereon a shoulder engaging a pawl on the disc; a second pawl on the disc engageable with a ratchet to rotate the ratchet when the disc is returned to its original position; and a means actuated by the ratchet to operate the ticket-issuing means to issue a number of tickets commensurate with the data represented by the settable device.

13. In a stamp-issuing machine having a main operating means operable a fixed extent for each machine cycle, the combination of feed means operable variable extents by the main operating means during each machine cycle to feed one or more stamps out of the machine; a differential means to determine the number of stamps to be issued during said machine cycle, said differential means having a home position and a plurality of adjusted positions; means to move the differential means from its home position into any one of said adjusted positions; a stop to arrest the differential means in any one of said adjusted positions; amount-determining manipulative devices; connections settable by the manipulative devices to position the stop in a position commensurate with the value of a manipulative device; a plurality of shoulders on the differential means, said shoulders selectively coacting with the stop depending upon the position to which the stop is adjusted; means actuated by the main operating means to restore the differential means from any one of said adjusted positions into its home position as the main operating means operates said fixed extent; and connections between the differential means and the feeding means, said connection being operated by the differential means to operate the feeding means only as the differential means is restored to its home position to feed the desired number of stamps, determined by the manipulative device, out of the machine during one machine cycle.

JAKOB DEUTSCH.